US007737934B2

(12) United States Patent
Shih et al.

(10) Patent No.: US 7,737,934 B2
(45) Date of Patent: Jun. 15, 2010

(54) PIXEL STRUCTURE OF LIQUID CRYSTAL DEVICE AND DRIVING METHOD THEREOF

(75) Inventors: Po Sheng Shih, Tao-Yuan County (TW); Chao Hui Wu, Tao-Yuan County (TW); Sweehan J. H. Yang, Tao-Yuan County (TW); Po Yang Chen, Tao-Yuan County (TW)

(73) Assignee: HannStar Display Corporation, Tao-Yuan County (TW)

( * ) Notice: Subject to any disclaimer, the term of this patent is extended or adjusted under 35 U.S.C. 154(b) by 933 days.

(21) Appl. No.: 11/233,817

(22) Filed: Sep. 23, 2005

(65) Prior Publication Data

US 2007/0070014 A1 Mar. 29, 2007

(51) Int. Cl.
*G09G 3/36* (2006.01)

(52) U.S. Cl. ............................ 345/94; 349/33; 349/139

(58) Field of Classification Search ........... 345/87–100; 349/33, 34, 141, 143, 191
See application file for complete search history.

(56) References Cited

U.S. PATENT DOCUMENTS 6,005,646 A 12/1999 Nakamura et al.
6,115,087 A 9/2000 Ohi
6,226,058 B1 5/2001 Ohi
6,597,424 B2 7/2003 Hattori et al.
6,661,491 B2 12/2003 Yamakita et al.
6,671,009 B1 12/2003 Hatta et al.
6,873,377 B2 3/2005 Konno et al.
2006/0007096 A1 * 1/2006 Kawaguchi et al. ......... 345/102

FOREIGN PATENT DOCUMENTS

WO WO 2004063801 A1 * 7/2004

* cited by examiner

*Primary Examiner*—Sumati Lefkowitz
*Assistant Examiner*—Seokyun Moon
(74) *Attorney, Agent, or Firm*—Volpe and Koenig PC

(57) ABSTRACT

A driving method for activating an optical self-compensated birefringence mode liquid crystal device is provided. The optical self-compensated birefringence mode liquid crystal device has plural pixel structures, plural substrates and a liquid crystal layer sandwiched between the plural substrates. Each of said plural pixel structures comprises a first electrode, a second electrode, a pixel electrode and a common electrode. The driving method comprising steps of: providing a space between said first electrode and said second electrode on one of plural substrate; providing a first potential difference between said first electrode and said second electrode to generate a first electric field; and performing an initialization process from a bend of said second electrode to transitioning an alignment state of said liquid crystal layer from a non-display alignment state to a display alignment state by said first electric field. Further, generate a second electric field by a second potential difference between said pixel electrode and said common electrode.

18 Claims, 11 Drawing Sheets

401
402

401
402

401
402

401
402

PIXEL STRUCTURE OF LIQUID CRYSTAL DEVICE AND DRIVING METHOD THEREOF

FIELD OF THE INVENTION

The present application relates to a pixel structure and a driving method for a liquid crystal device, and more particularly to the pixel structure and the driving method for the optically compensated birefringence (OCB) mode liquid crystal device.

BACKGROUND OF THE INVENTION

In recent years, studies on the optically compensated birefringence (OCB) cell that is to be used as a liquid crystal cell instead of a twisted nematic (TN) cell have been quickly increased. In the OCB mode liquid crystal device, the liquid crystal molecules therein are in splay state at the initial state. However, when a voltage is applied to the OCB mode liquid crystal device, the liquid crystal molecules therein will transit from the splay state to the bend state, and it is required to spend some time for the transition from the splay state to the bend state. In the bend state, the top and bottom liquid crystal molecules are always oriented symmetrically, and thus to compensate the birefringence of liquid crystal molecules so as to obtain the uniform viewing angle characteristic at all directions is more easily than that obtained with the orientation division method, and a high-speed response characteristic that is one order faster than that for the conventional TN cells may also be obtained accordingly.

FIGS. 1A and 1B respectively illustrate the liquid crystal molecules in splay state and bend state in the OCB mode liquid crystal display device. As shown in FIG. 1A, in splay state, the liquid crystal molecules 104 are uniformly splayed between the glass substrates 100 and 102. However, when a voltage is applied to the glass substrates 100 and 102, the liquid crystal molecules 104 will be in bend state, as shown in FIG. 1B. In which, the transition time of the liquid crystal molecules 104 from the splay state to the bend state is one of the determinants for the OCB mode liquid crystal display device due to the fact that all the electro-optical properties of the OCB mode liquid crystal display device are operated when the liquid crystal molecules therein are in bend state.

However, some pixel structures have been disclosed, such as those disclosed in U.S. Pat. Nos. 6,115,087, 6,226,058, 6,661,491 and U.S. Pat. No. 6,597,424, but, some of them are not suitable for OCB mode liquid crystal display devices and there still exist some demerits in the disclosed pixel structures. In addition, the conventional pixel structures usually have the demerits, for example, a space exists between the pixel electrode and the gate electrode, and the common electrode must be introduced and overlapped with the pixel electrode for a certain area so as to form a storage capacitor. However, the above two demerits will result in a small aperture and cause the conventional pixel structures incompatible with the three-level gate driving.

In addition, although some driving methods for a liquid crystal device have been disclosed, such as that Takayuki Konno et al., (U.S. Pat. No. 6,873,377) and Katsuji Hattori et al., (U.S. Pat. No. 6,671,009) have disclosed a driving method for an OCB mode liquid crystal display and Hajime Nakamura et al., (U.S. Pat. No. 6,005,646) have disclosed another driving method for a thin film transistor liquid crystal display (TFT/LCD), there still exist some defects in the disclosed driving methods. For example, the driving method proposed by Katsuji Hattori et al. has a complicated signal input procedure and the applied system design always needs an alignment transition driving circuit, a switching control circuit and a switching circuit. In other words, the cost for the driving method of Katsuji Hattori et al. is always high and the relevant driving method is not so practical, especially for the trend of compactness. In addition, since the potential difference between the signal electrode and the common electrode is morn than 10 volts and that between the gate electrode and the signal electrode is also more than 10 volts in the driving method proposed by Hajime Nakamura, there might exist some problems about the poor uniformity and the slow transition time in driving method of the prior arts.

As above, since all the electro-optical properties of the OCB mode liquid crystal display device are operated only when the liquid crystal molecules therein are in bend state, the liquid crystal molecules in the OCB mode liquid crystal display devices need to be transformed from the splay state (non-display state) into the bend state (display state) before being used and there still exist some demerits in the conventional pixel structures and driving methods, new driving methods with shorter transition time and new pixel structures contributive to shorten the transition time for activating OCB mode liquid crystal display device are desired.

SUMMARY OF THE INVENTION

In accordance with one aspect of the present application, a driving method for activating an optical self-compensated birefringence mode liquid crystal device is provided. The optical self-compensated birefringence mode liquid crystal device has plural pixel structures, plural substrates and a liquid crystal layer sandwiched between the plural substrates. Each of said plural pixel structures comprises a first electrode, a second electrode, a pixel electrode. The driving method comprising steps of: providing a space between said first electrode and said second electrode on one of plural substrate; providing a first potential difference between said first electrode and said second electrode to generate a first electric field; and performing an initialization process from a bend of said second electrode to transitioning an alignment state of said liquid crystal layer from a non-display alignment state to a display alignment state by said first electric field. Further, generate a second electric field by a second potential difference between said pixel electrode and a common electrode.

In accordance with another aspect of the present application, a liquid crystal display device is provided. The liquid crystal display device has a first substrate, a second substrate opposite to the first substrate, a pixel electrode formed on the first substrate, and a liquid crystal layer sandwiched between the first substrate and the second substrate. The liquid crystal display device includes a first electrode provided on the first substrate, a second electrode located on the first substrate and having a bend portion, and a driving means generating a potential difference between the first electrode and the second electrode. There is a space between the first electrode and the second electrode.

The foregoing and other features and advantages of the present invention will be more clearly understood through the following descriptions with reference to the drawings, wherein:

DETAILED DESCRIPTION OF THE PREFERRED EMBODIMENTS

The present application will now be described more specifically with reference to the following embodiments. It is to be noted that the following descriptions of preferred embodiments of this application are presented herein for purpose of illustration and description only; it is not intended to be exhaustive or to be limited to the precise form disclosed.

Figures 1A, 1B:
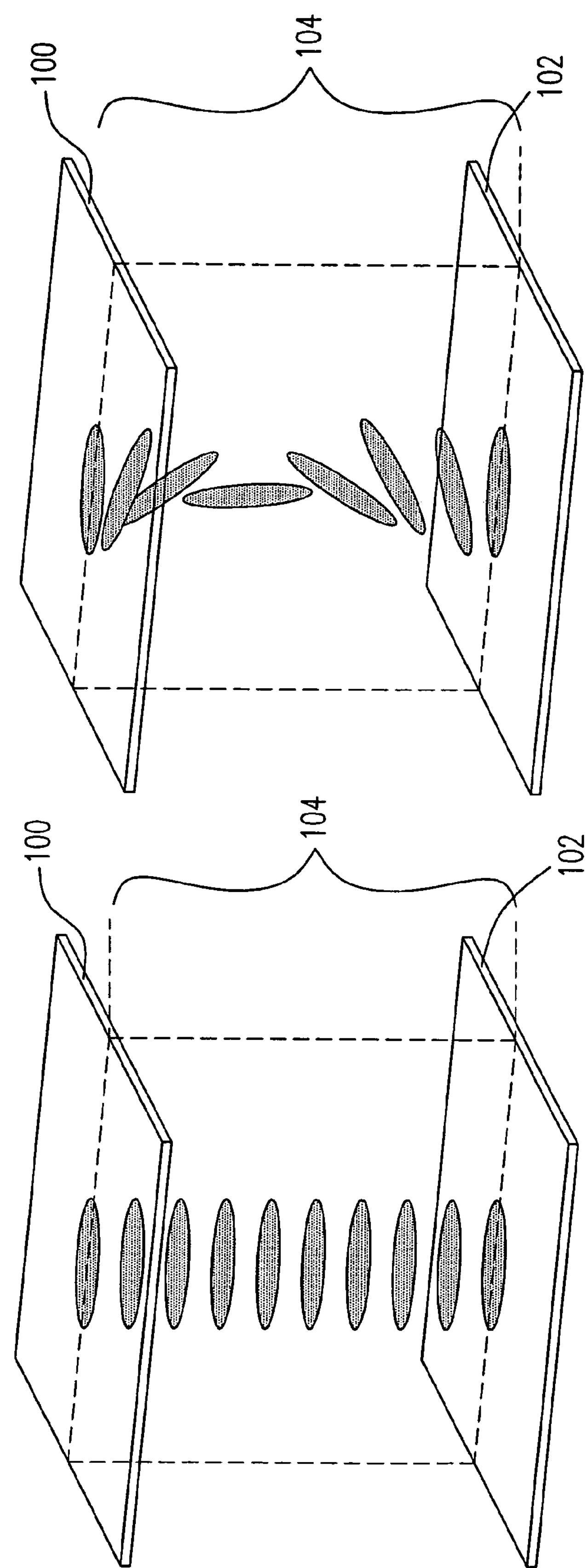
FIGS. 1A and 1B respectively illustrate the liquid crystal molecules in splay state and bend status in the OCB mode liquid crystal display device.
Figure 2A:
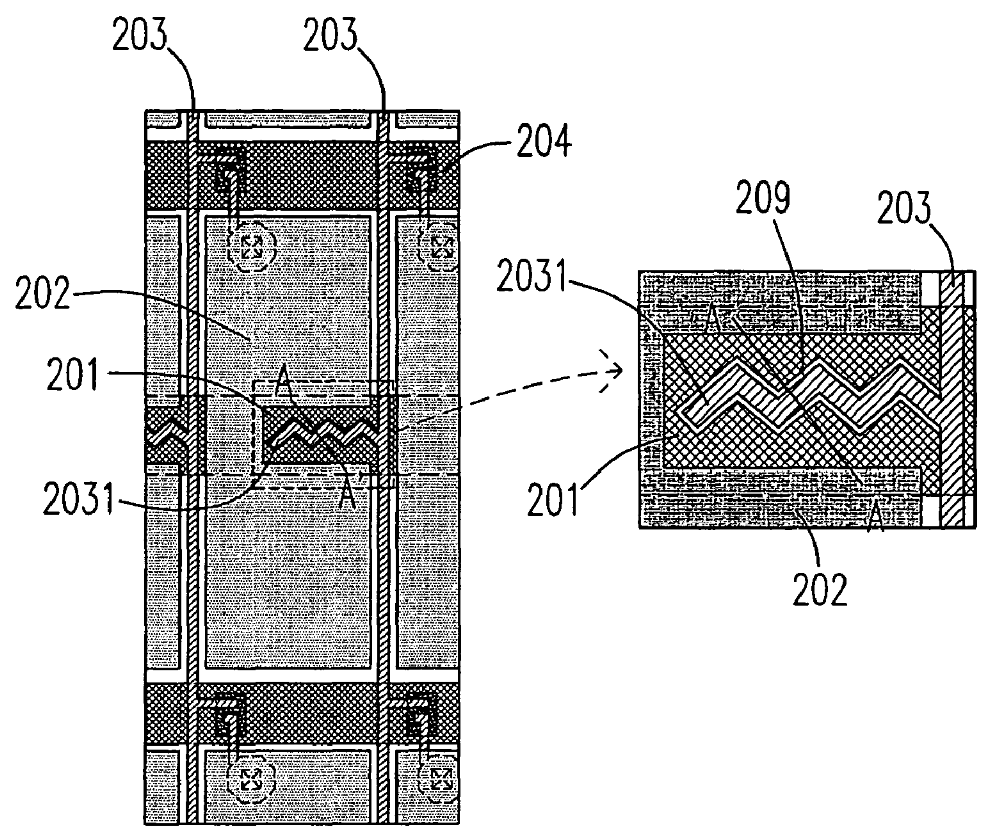
FIGS. 2A and 2B respectively show the electrode structure of the pixel structure according to a first preferred embodiment of the present application and the cross-sectional view along the AA' line in FIG. 2A.
Figure 2B:
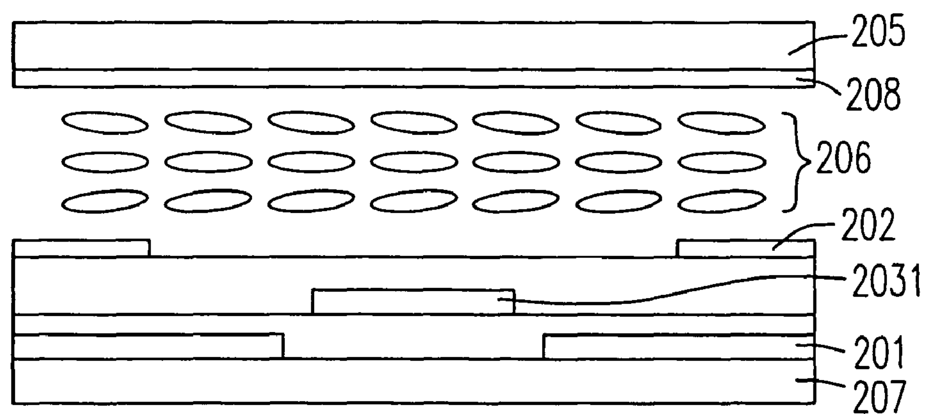

Please refer to FIGS. 2A and 2B, which respectively show the pixel structure according to a first preferred embodiment of the present application and the cross-sectional view along the AA' line in FIG. 2A.

As shown in FIGS. 2A and 2B, the pixel electrode 202 is partially overlapped with the bias electrode 201, the data line 203 has an extension portion 2031 with a meander shape extending to the middle of the pixel region. In addition, as shown in FIG. 2B, a common electrode 208 is located on the upper glass substrate 205, the pixel electrode 202 is located between the bias electrode 201 and the common electrode 208, and the crystal liquid molecules. 206 are sandwiched between the upper glass substrate 205 and the lower glass substrate 207. In addition, the bias electrode 201 and the gate line 204 are in the same layer. Furthermore, as shown in FIG. 2A, there exists a space 209 between the bias electrode 201 and the extension portion 2031. And the bias electrode 201 includes an opening for containing the extension portion 2031 of the data line 203 and the space 209. Wherein the edges of the opening of the bias electrode 201 and the extension portion 2031 are complementary to each other; and the shape of the space 209 between the bias electrode 201 and the extension portion 2031 is the same as that of the extension portion 2031. It should be noted that the extension portion 2031 could also be in the serpentine shape, zigzag shape, crank-like shape, wave shape, frame-like shape, and cross-like shape. In general, the applied space 209 is ranged from 1 μm to 15 μm, preferably from 3 μm to 6 μm. Besides, it should be noted that the space 209 and the opening of the bias electrode 201 are in one shape selected from a group consisting of the serpentine shape, zigzag shape, crank-like shape, wave shape, frame-like shape, and cross-like shape, L-shape, stair-shape, bend shape, meander-shape and so on.

Figure 2C:
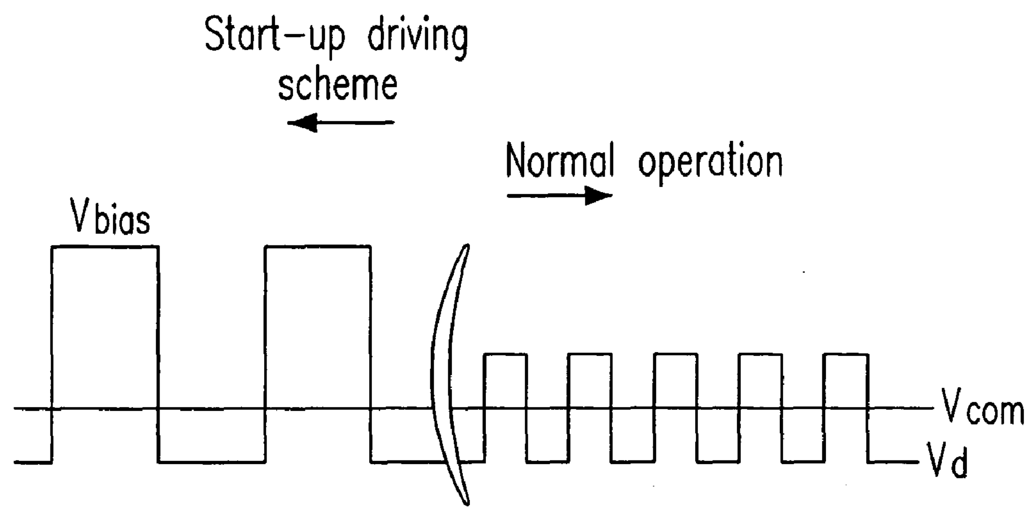
FIGS. 2C and 2D respectively show the diagrams of the bias electrode supplied with an alternating voltage and a direct voltage.
Figure 2D:
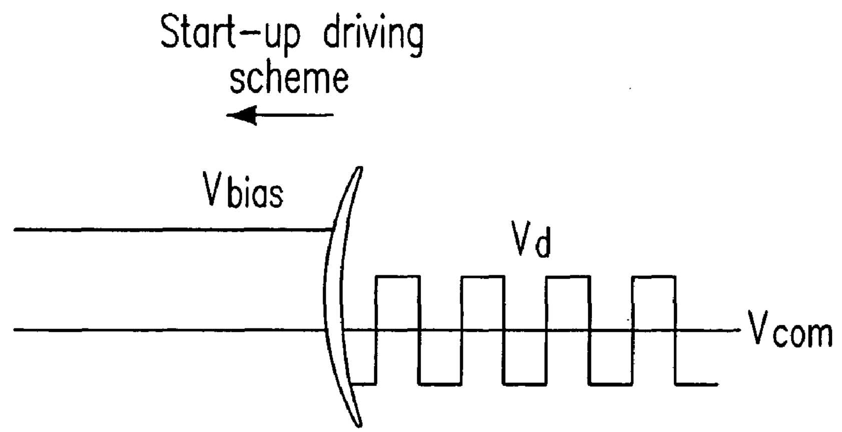

During the process of driving an OCB mode liquid crystal display device with the pixel structure shown in FIGS. 2A and 2B, a lateral electric field is first formed by modulating the potential difference between the bias electrode 201 and the extension portion 2031 of the data line 203 so as to result in the bend nuclei of the liquid crystal molecules therein (not shown), and then a vertical electric field is formed by modulating the potential difference between the pixel electrode 202 and the common electrode 208 so as to result in the bend transition of the liquid crystal molecules therein. When the applied voltages on the bias electrode 201, the pixel electrode 202 and common electrode 208 are respective ±20 Volt, ±6 Volt and −30 Volt, it is found that the transition time for the liquid crystal molecules (not shown) is less than 0.5 second. In addition, when the applied voltages on the bias electrode 201, the pixel electrode 202 and common electrode 208 are respective 25 Volt, ±6 Volt and 30 Volt, it is found the transition time for the liquid crystal molecules is similarly less than 0.5 second. However, in order to simply illustrate the applied voltages of the driving method according to the present application could be provided by an alternating voltage or a direct voltage, FIGS. 2C and 2D, which respectively show the diagrams of the driving method activated by an alternating voltage and a direct voltage, are provided. In FIGS. 2C, and 2D, the voltages of the bias electrode, the data line and the common electrode are respectively indicated by Vbias, Vd and Vcom.

As above, however, since the given period for transforming the alignment state of the liquid crystal molecule from the splay state into the bend state at the start of LCDs operation could be substantially reduced according to the driving method and the pixel structure of the present application, the LCDs using one of the pixel structure and driving method or both of the present invention has a high-speed response as well as a high display quality.

Figure 2E:
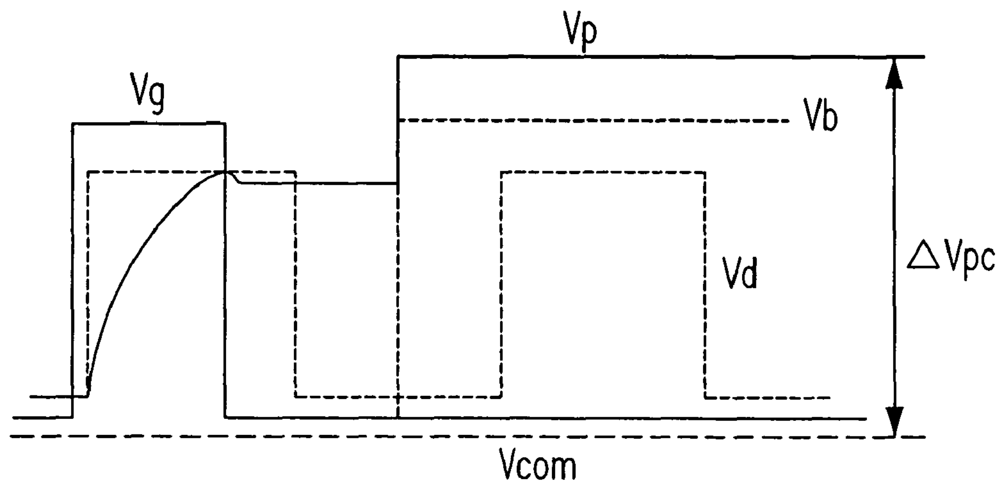
FIGS. 2E and 2F respectively show the relative voltage relationships among the pixel electrode, the gate electrode, the bias electrode, the data line and the common electrode under the positive polarity and the negative polarity when an alternating voltage is applied to the OCB mode liquid crystal display device.
Figure 2F:
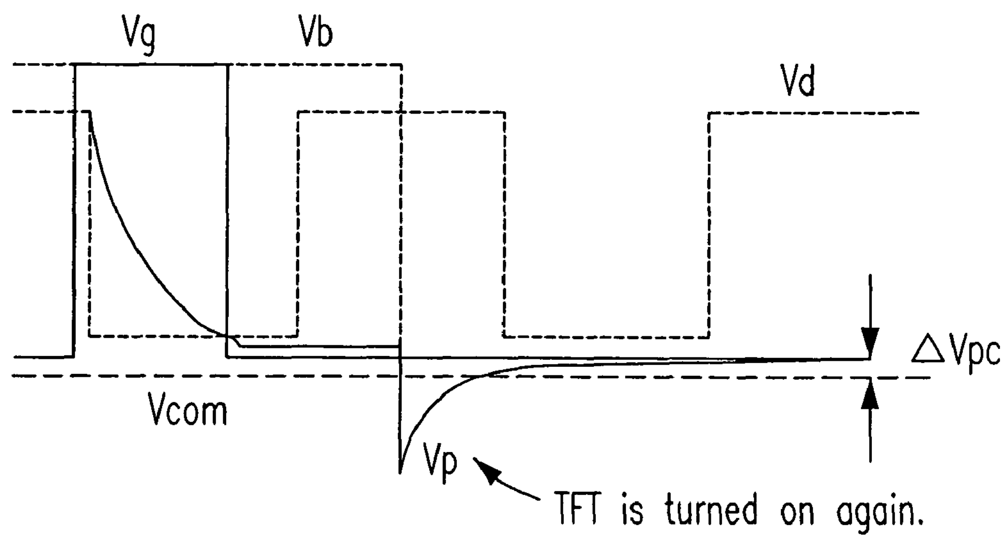

Please refer to FIGS. 2E and 2F, which respectively show the voltage relationships among the pixel electrode, the gate electrode, the bias electrode, the data line and the common electrode under the positive polarity and the negative polarity when an alternating voltage is applied to the OCB mode liquid crystal display device. In FIGS. 2E and 2F, the voltages of the pixel electrode, the gate electrode, the bias electrode, the data line and the common electrode are respectively indicated by Vp, Vg, Vb, Vd and Vcom. After the relevant pixel structure is configured, Vp thereof will be easily coupled to a higher voltage (or a lower voltage) due to the Vb coupling effect and the potential difference ΔVpc among Vp and Vc will be increased accordingly. However, when the thin film transistor (TFT) (not shown) is turned on again, the potential difference ΔVpc will become small again.

Figure 3B:
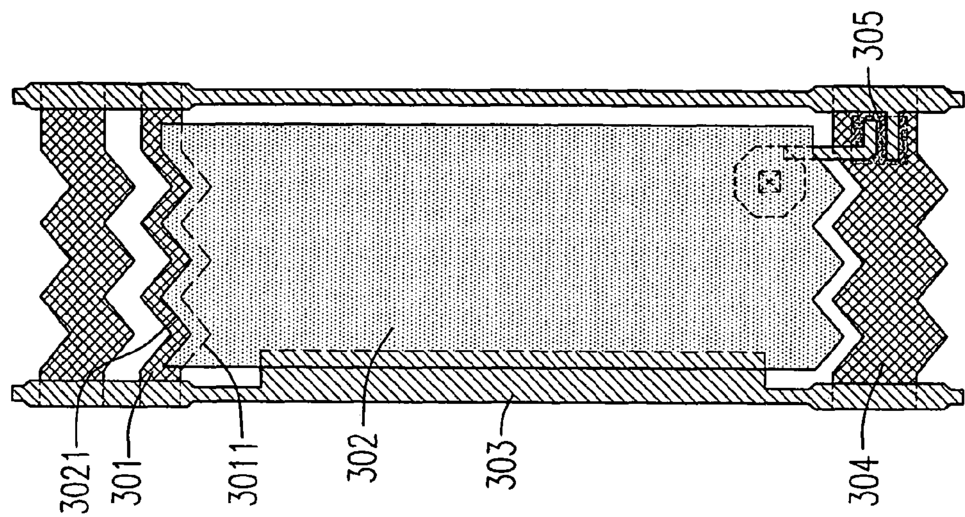
FIGS. 3A and 3B respectively show a pixel structure of an optical self-compensated birefringence mode liquid crystal device according to a second and a third preferred embodiments of the present application.
Figure 3A:
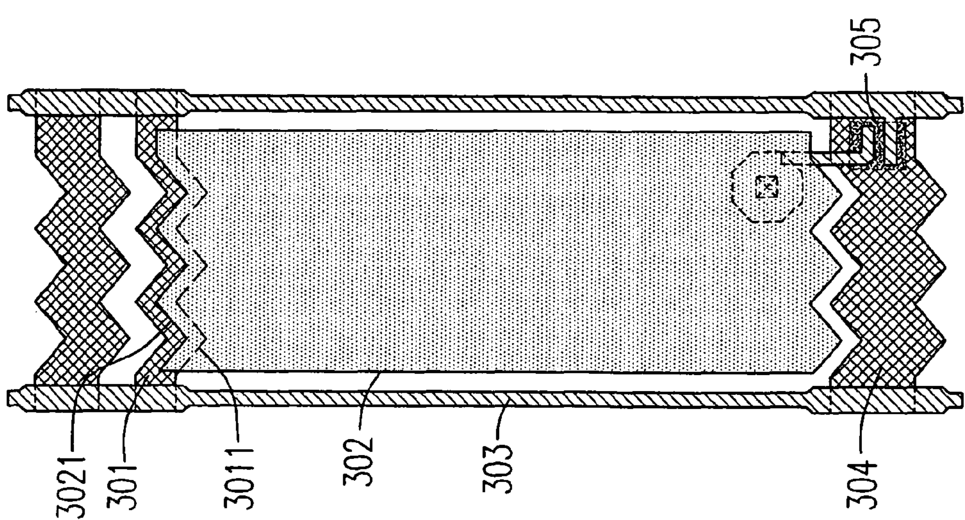
Figures 4A, 4B, 4C, 4D:
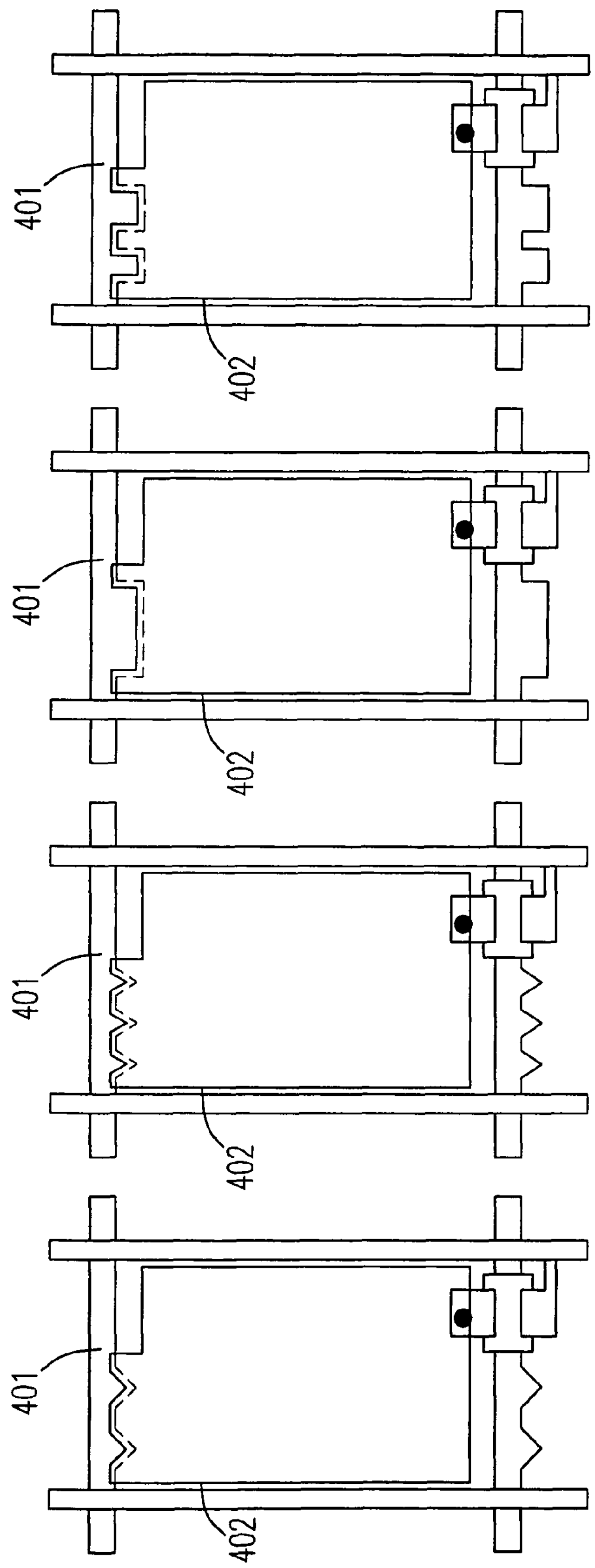
FIGS. 4A to 4D respectively show the pixel structures of an optical self-compensated birefringence mode liquid crystal device according to the forth, fifth, sixth and seventh preferred embodiments of the present application.

Please refer to FIGS. 3A and 3B, which respectively show a pixel structure of an optical self-compensated birefringence mode liquid crystal device according to a second and a third preferred embodiments of the present application.

As shown in FIG. 3A, in the pixel structure according to the present application, the bias electrode 301 is partially overlapped with the pixel electrode 302 via the saw-toothed protrusions 3011 and 3021 respectively belong to the bias electrode 301 and pixel electrode 302. The driving transistor 305 is electrically connected to the data line 303 and the gate line 304 and the pixel electrode 302 for controlling the potential differences there-among. Therefore, by scanning the gate line 304 in accordance with the gate signals, the driving transistors 305 in the same given gate line 304 are turned on. At the same time, signals in the data line 303 are transferred to the pixel electrode 302 through the driving transistor 305 to show a picture on the liquid crystal display device. When the applied voltages for the data line 303, the gate line 304 and the bias electrode 301 are respectively ±6 Volt, 10 Volt and ±20 Volt, it is found that the seed propagations of the liquid crystal molecules are not only easily formed at the bottom of the pixel electrode 302, where the pixel electrode 302 is not overlapped with the gate line 304, but also at the top of the pixel electrode 302, where the pixel electrode 302 is overlapped with the bias electrode 301 (the relevant result is not shown here). Furthermore, as in FIG. 3A, a storage capacitor (not shown) is inherently formed between the pixel electrode 302 and the gate line 304. Therefore, the aperture ratio of the new pixel structure in FIG. 3A is increased when it is compared to the conventional ones. Furthermore, it should be noted that, in a similar embodiment, it is possible that the data line 303 is partially overlapped with the pixel electrode 302, as shown in FIG. 3B.

Please refer to FIGS. 4A to 4D, which respectively show the pixel structures of an optical self-compensated birefringence mode liquid crystal device according to the forth, fifth, sixth and seventh preferred embodiments of the present application.

As shown in FIGS. 4A to 4D, all the pixel electrodes 402 according to the forth, fifth, sixth and seventh preferred embodiments of the present application are partially overlapped with the bias electrodes 401. In which, the protrusions of the pixel electrode 402 and the bias electrode 401 could be taper-shape, rectangular, or saw-toothed and so on.

In addition, please also refer to FIGS. 5A to 5E, which respectively show the pixel structures of the optical self-compensated birefringence mode liquid crystal devices according to eighth, ninth, tenth, eleventh, twelfth and thirteenth preferred embodiments of the present application. These embodiments introduce an initialization process activated by an lateral electric field provided from any two selected from the group consisting of the gate line, bias electrode and data line.

Figure 5A:
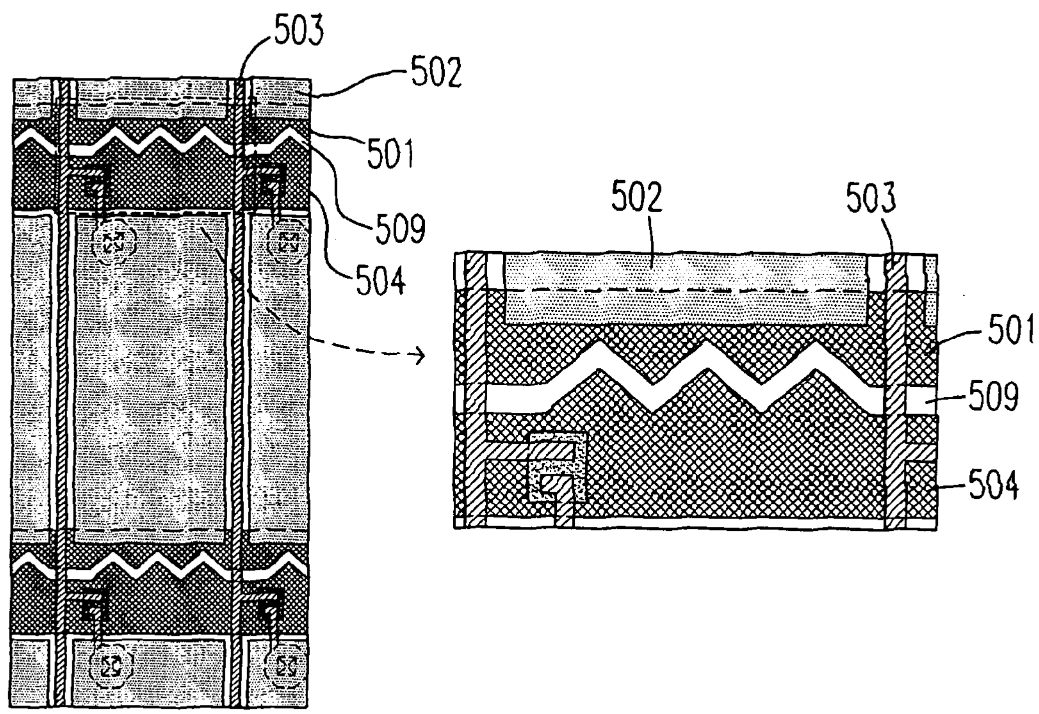
FIGS. 5A to 5F respectively show the pixel structures of the optical self-compensated birefringence mode liquid crystal devices according to eighth, ninth, tenth, eleventh, twelfth and thirteenth preferred embodiments of the present application.

As shown in FIG. 5A, the pixel electrode 502 is partially overlapped with the bias electrode 501, and there is a space 509 between the bias electrode 501 and the gate line 504. The bias electrode 501 is located in the same layer of the gate line 504. In the other hand, the bias electrode 501 and the gate line 504 could be formed and defined simultaneously. Furthermore, as shown in FIG. 5A, the edges of the bias electrode 501 and the gate line 504 are complementary to each other. And the shape of the space 509 between the bias electrode 501 and the gate line 504 is dependent on that of extension portion 5031,such as meander-shaped.

However, during the driving process, since there is a space 509 between the bias electrode 501 and the gate line 504, a lateral electric field could be formed by modulating the potential difference between the bias electrode 501 and the gate line 504. In addition, the pixel electrode 502 is overlapped with the common electrode located on the upper glass substrate (not shown), and thus a vertical electric field might be formed by modulating the potential difference therebetween.

Figure 5B:
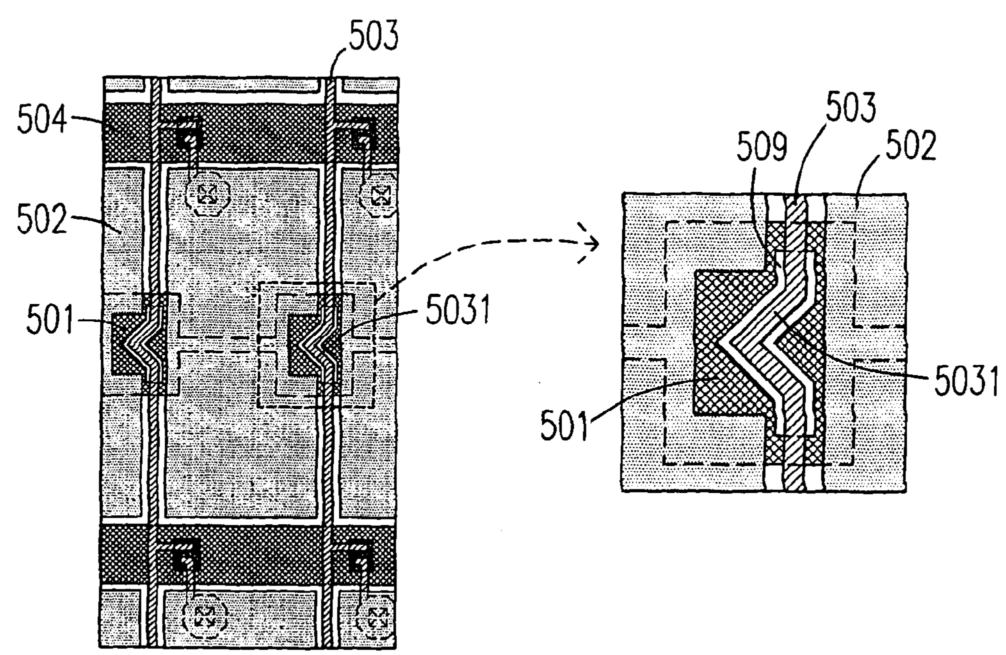
Figure 5C:
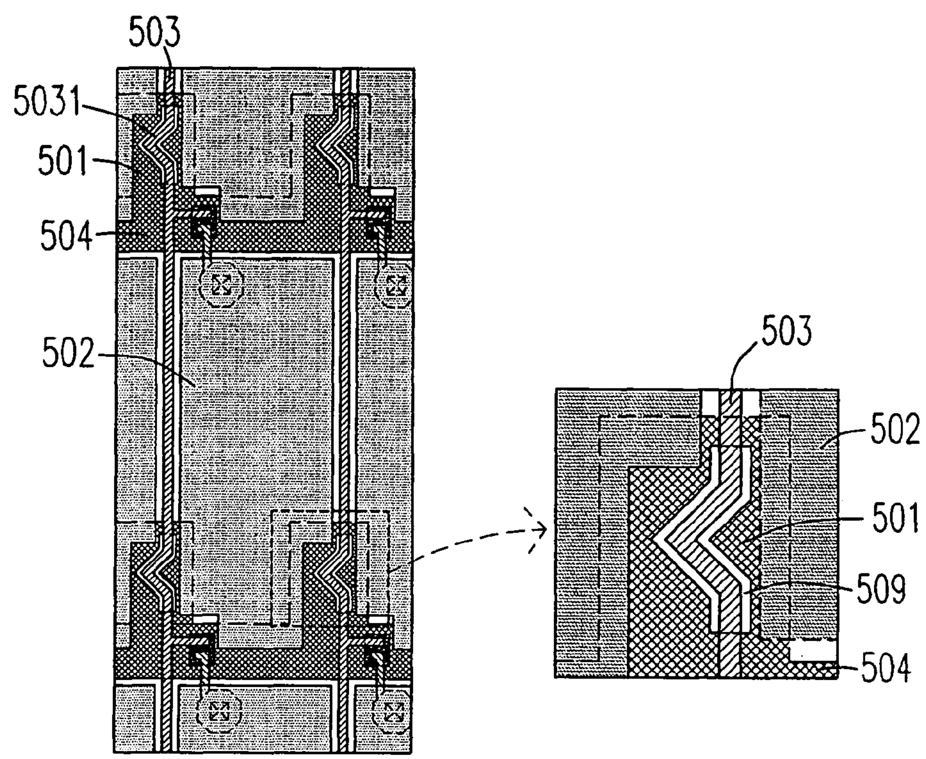

As shown in FIGS. 5B and 5C, the pixel electrode 502 is partially overlapped with the bias electrode 501, and the data line 503 has a bend 5031. Furthermore, although the data line 503 is partially overlapped with the bias electrode 501, there still exists a space 509 between the bias electrode 501 and the bend 5031. The bias electrode 501 includes an opening for containing the bend 5031 of the data line 503 and the space 509. The bias electrode 501 is located in the same layer of the gate line 504. In the other hand, the bias electrode 501 and the gate line 504 could be defined simultaneously. In addition, it should be noted that the bias electrode 501 could be within the pixel region, as shown in FIG. 5B, or could be an extension portion of the gate line 804, as shown in FIG. 5C. And, the bias electrode 501 is partially overlapped with pixel electrode 802 in FIGS. 5B and 5C. Furthermore, as shown in F*igs*. 5B and 5C, the edges of the opening of the bias electrode 501 and the bend 5031 are complementary to each other, and the shape of the spaces 509 between the bias electrode 501 and the bend 5031 are dependent on that of extension portion 5031, such as meander shaped.

However, during the driving process, since there is a space 509 between the bias electrode 501 and the data line 503, a lateral electric field could be formed by modulating the potential difference therebetween. In addition, since the pixel electrode 502 is overlapped with the common electrode located on the upper glass substrate (not shown), a vertical electric field could be formed by modulating the potential difference therebetween.

Figure 5D:
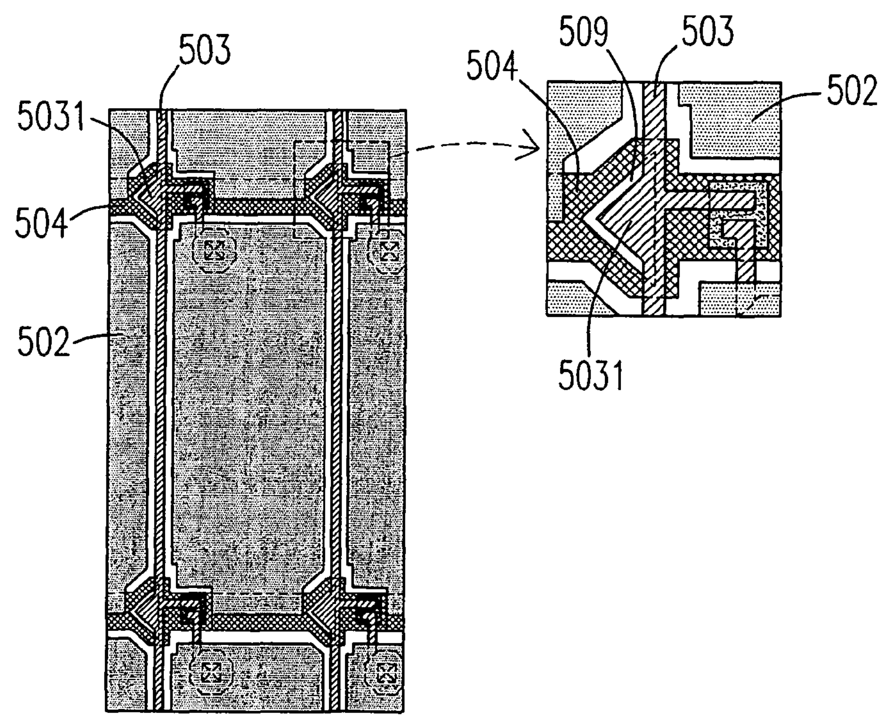
Figure 5E:
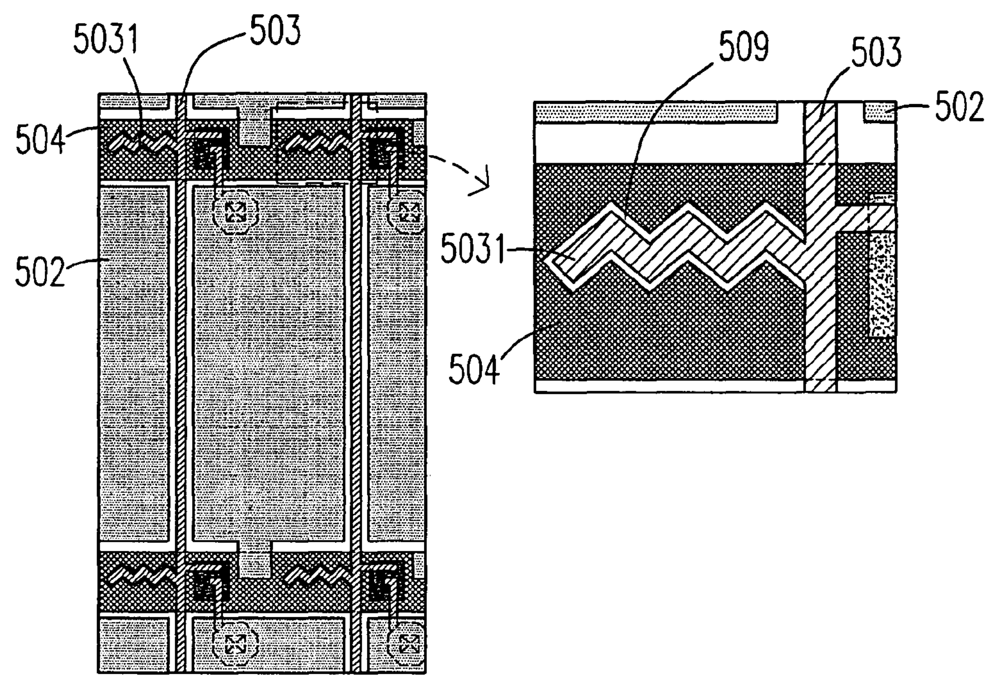

As shown in FIGS. 5D and 5E, the pixel electrode 502 is partially overlapped with the gate line 504, and the data line 503 has an extension portion 5031. Furthermore, there exists a space 509 between the gate line 504 and the extension portion 5031. And, the gate line 504 includes an opening for containing the extension portion 5031 of the data line 503 and the space 509. Besides, it should be noted that the extension portion 5031 could be a triangle-shaped protrusion or a meander shape including the serpentine shape, zigzag shape, crank-like shape, wave shape, frame-like shape, and cross-like shape. Furthermore, as shown in FIGS. 5D and 5E, the edges of the opening of the gate line 504 and the extension portion 5031 are complementary to each other, and the shape of the space 509 between the gate line 804 and the extension portion 5031 is dependent on that of extension portion 5031, such as triangle-shaped or meander-shaped.

However, during the driving process, since there is a space 509 between the gate line 504 and the extension portion 5031 of the data line 503, a lateral electric field could be formed by modulating the potential difference therebetween. In addition, the pixel electrode 502 is overlapped with the common electrode located on the upper glass substrate (not shown), and thus a vertical electric field might be formed by modulating the potential difference therebetween.

Figure 5F:
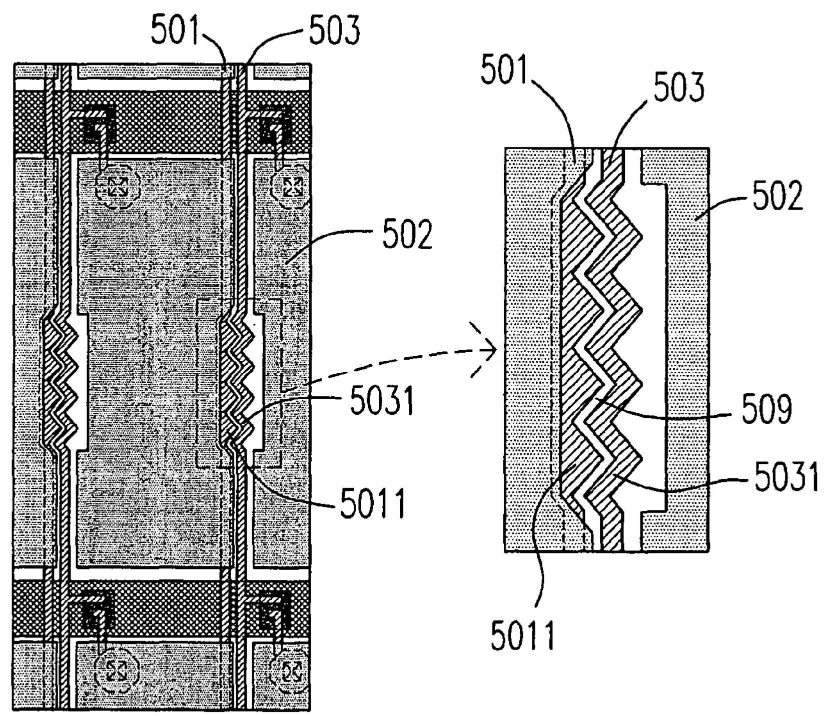

As shown in FIG. 5F, the bias electrode 501 is partially overlapped with the pixel electrode 502, and the data line 503 has the bend 5031 with a meander shape. The bias electrode 501 located in the same layer of the data line 503 has the protrusion 5011. In the other hand, the bias electrode 501 and the date line 503 could be defined simultaneously. In addition, there exists a space 509 between the protrusion 5011 and the meander-shaped bend 5031. Furthermore, the edges of the protrusion 5011 and the meander-shaped bend 5031 are complementary to each other. As shown in FIG. 5F, the shape of space 509 between the protrusion 5011 and the meander-shaped bend 5031 is dependent on that of the meander-shaped bend 5031.

However, during the driving process, since there is a space 509 between the bias electrode 501 and the data line 503, a lateral electric field could be formed by modulating the potential difference therebetween. In addition, the pixel electrode 502 is overlapped with the common electrode located on the upper glass substrate (not shown), and thus a vertical electric field might be formed by modulating the potential difference therebetween.

In general, as shown in FIGS. 5A to 5F, the applied space 509 is ranged from 1 μm to 15 μm, preferably from 3 μm to 6

μm. The pixel electrode 502 is made from a transparent conductor, such as ITO, IZO, ITZO or AZO, and so on. Besides, the space 509 and the opening of the bias electrode 501 and gate line 504 are in a shape selected from the group consisting of the serpentine shape, zigzag shape, crank-like shape, wave shape, frame-like shape, cross-like shape, L-shape, stair-shape, bend shape, meander-shape and so on.

However, it also should be noted that, according to the present application, a lateral electric field is formed by modulating the potential differences between any two selected from the group consisting of the gate line, bias electrode and data line. Furthermore, the above-applied voltages need not be limited to the disclosed embodiments. In addition, as above, it is also found that no matter an alternating voltage or a direct voltage is supplied to the bias electrode, the transition time for the liquid crystal molecules according to the driving method of the present application is less than 0.5 sec, which is much less than the transition time of the conventional driving method.

Figure 6A:
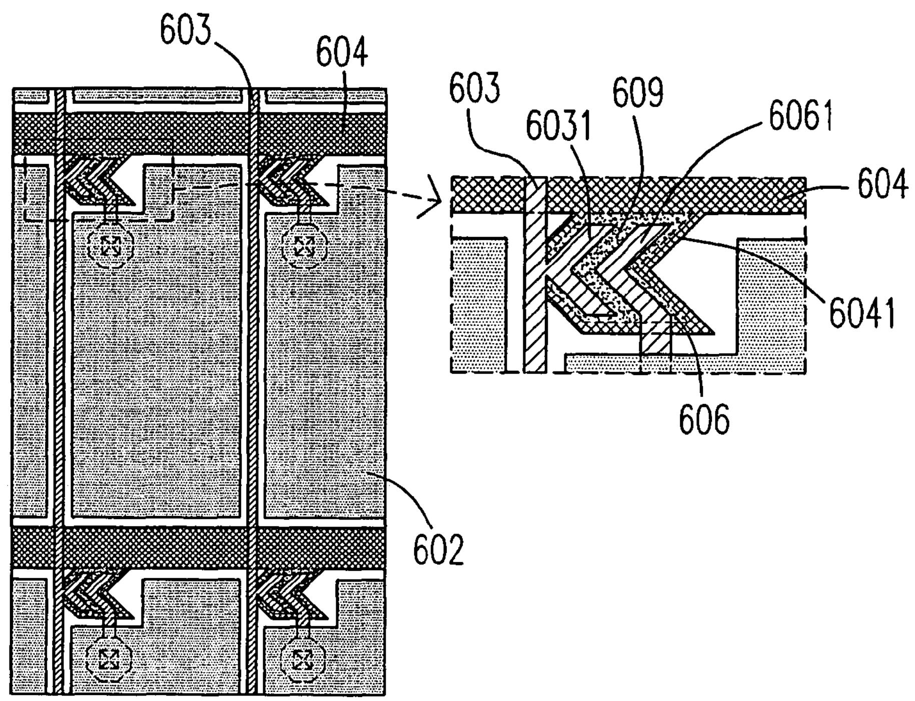
FIGS. 6A to 6C respectively show the pixel structures of the optical self-compensated birefringence mode liquid crystal devices according to the fourteenth, fifteenth, and sixteenth preferred embodiments of the present application.
Figure 6B:
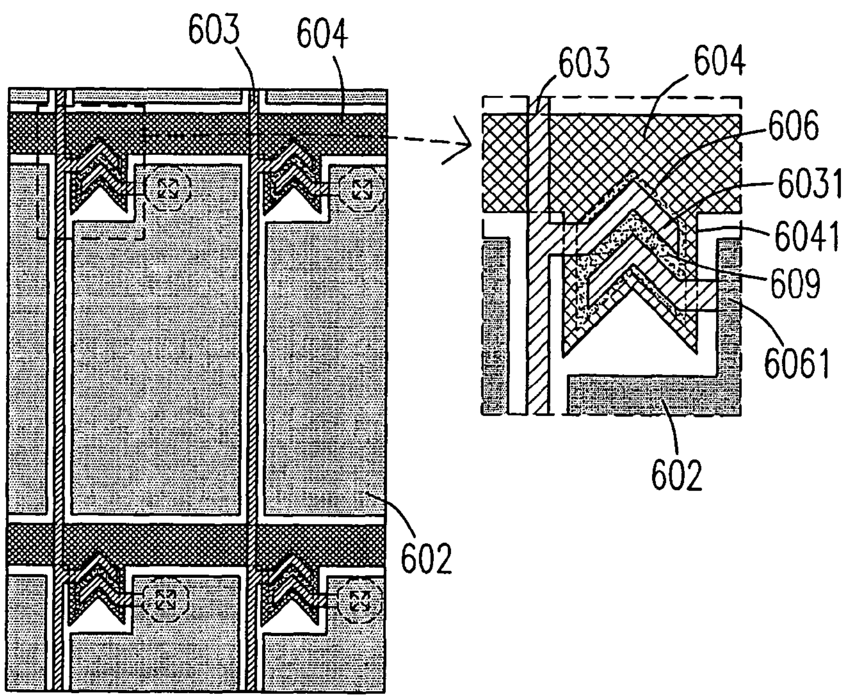
Figure 6C:
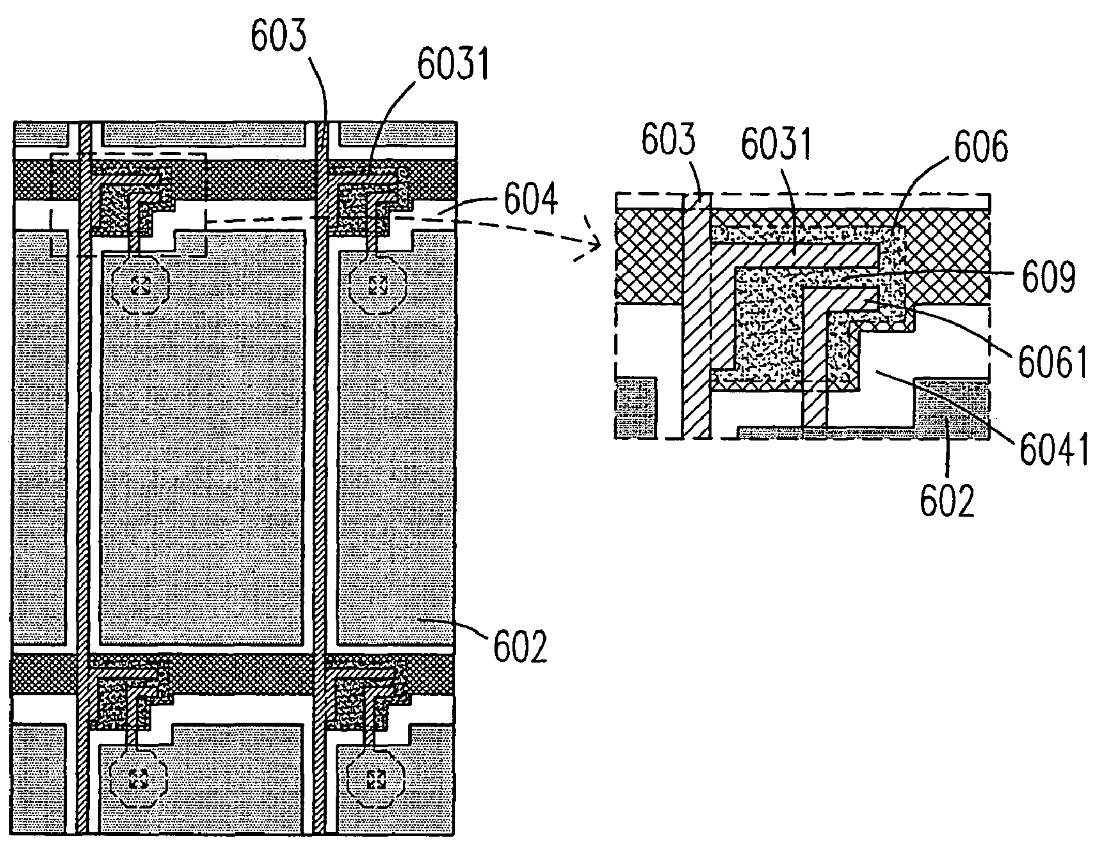

In addition, please also refer to FIGS. 6A to 6C, which respectively show the pixel structures of the optical self-compensated birefringence mode liquid crystal devices according to fourteenth, fifteenth, and sixteenth preferred embodiments of the present application.

As shown in FIGS. 6A to 6C, the gate line 604 has an extension portion 6041 close to the cross point of the gate line 604. Besides those illustrated in FIGS. 6A to 6C, the extension portion 6041 be also able in other shapes, such as the triangle, rectangle, L shape, stair shape, bend shape, meander shape and so on. Moreover, a first bending electrode 6031 of the data line 603 and a second bending electrode 6061 are over the extension portion 6041. And the second bending electrode 6061 is connected to the pixel electrode 602. Furthermore, there exists a space 609 between the first bending electrode 6031 and the second bending electrode 6061. And the shapes of the first bending electrode 6031 and the second bending electrode 6061 are complementary to each other. In other words, the first bending electrode 6031 and the second bending electrode 6061 have the similar pattern to that of the extension portion 6041 of the gate line 604.

As shown in FIGS. 6A-6C, the shape of the space 609 between the first bending electrode 6031 and the second bending electrode 6061 is the same as that of the first bending electrode 6031 and the second bending electrode 6061. It should be noted that, besides those disclosed in FIGS. 6A-6C, the space 609 could be in other shapes, such as the triangle, rectangle, L shape, stair shape, bend shape, meander-shape and so on. In addition, the bending points of the first bending electrode 6031 and the second bending electrode 6061 are toward the same direction to that of the data line 603 or the gate line 604.

The second bending electrode 6061, as the drain electrode of the transistor 606, is connected to the pixel electrode 602. Therefore, the signal in the data line 603 is ably transferred to the pixel electrode 602 via the first bending electrode 6031, as the source electrode of the transistor 606. However, by scanning the gate line 604 in accordance with the gate signals, the transistors 606 in the same given gate line 604 are turned on. At the same time, signals in the data line 603 are ably transferred to the pixel electrode 602 through the transistor 606 to show a picture on the relevant liquid crystal display device (not shown).

In general, the applied space 609 is ranged from 1 μm to 15 μm, preferably from 3 μm to 6 μm. The pixel electrode 602 is made from a transparent conductor, such as ITO, IZO, ITZO or AZO, and so on. Besides the above, the space 609 and the first bending electrode 6031 and the second bending electrode 6061 are also in other shapes, such as the serpentine shape, zigzag shape, crank-like shape, wave shape, frame-like shape, and cross-like shape, L shape, stair shape, bend shape, meander shape and so on.

As above, according to the pixel structure and the driving method of the present application, the period for transforming the liquid crystal molecule from the splay state into the bend state at the start-up of LCDs operation could be substantially reduced, and the LCDs using the pixel structure of the present application will have a high-speed response as well as a high display quality.

Furthermore, since the pixel structures of the present application are more compact than the conventional ones and have a high-speed response as well as a high display quality, and the driving methods thereof can significantly reduce the transition time of the liquid crystal molecules therein, the present application does have the progressiveness, novelty and industrial utility.

While the application has been described in terms of what are presently considered to be the most practical and preferred embodiments, it is to be understood that the application need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present application which is defined by the appended claims.

What is claimed is:

1. A driving method for activating an optical self-compensated birefringence mode liquid crystal device having plural pixel structures, plural substrates and a liquid crystal layer sandwiched between said plural substrates, wherein each of said plural pixel structures comprises a first electrode having a vertical edge and an opening, a second electrode having a plurality of vertical edges, and a pixel electrode, said edges of said first electrode and said second electrode are complementary to each other, said second electrode has a bend being a polygon with one shape selected from a group consisting of a triangle, a rectangle, an L shape, a stair shape and a meander shape, said opening contains said bend, and said driving method comprises steps of:

- providing a horizontal space between said vertical edge of said first electrode and a respective one of said plurality of vertical edges of said second electrode being the closest one to said vertical edge of said first electrode on one of said plural substrates to make said first and said second electrodes be separated from each other in a horizontal direction;
- providing a first potential difference between said first electrode and said second electrode to generate a first electric field; and
- performing an initialization process from a bend of said second electrode to transitioning an alignment state of said liquid crystal layer from a non-display alignment state to a display alignment state by said first electric field.

2. The driving method as claimed in claim 1 further comprising the step of: providing a second potential difference between said pixel electrode and a common electrode to generate a second electric field.

3. The driving method as claimed in claim 1, wherein said first electrode and the second electrode are any two selected from the group consisting of a gate line, a bias electrode and a data line.

4. The driving method as claimed in claim 1 further comprising the step of: providing an alternating voltage to said first electrode.

5. The driving method as claimed in claim 1 further comprising the step of: providing a direct voltage to said first electrode.

6. An optical self-compensated birefringence mode liquid crystal device activated by said driving method of claim 1.

7. The optical self-compensated birefringence mode liquid crystal device as claimed in claim 6 wherein said space is preferably ranged from 1μm to 15μm.

8. The optical self-compensated birefringence mode liquid crystal device as claimed in claim 7, wherein said space is preferably ranged from 3μm to 6μm.

9. A liquid crystal display device having a first substrate, a second substrate opposite to said first substrate, a pixel electrode formed on said first substrate, a common electrode formed on said second substrate and a liquid crystal layer sandwiched between said first substrate and said second substrate, said liquid crystal display device further comprises:

a first electrode having plural edges and an opening, and provided on said first substrate;

a second electrode being free from overlap with said first electrode in a vertical direction, located on said first substrate with a space having a width to horizontally separate said first electrode from said second electrode, and having a bend portion contained in said opening and being a polygon with one shape selected from a group consisting of a triangle, a rectangle, an L shape, a stair shape and a meander shape, and plural edges being complementary to said plural edges of said first electrode; and a driving means generating a potential difference between said first electrode and said second electrode.

10. The liquid crystal display device as claimed in claim 9, wherein said space is ranged from 1μm to 15μm.

11. The liquid crystal display device as claimed in claim 10, wherein said space is preferably ranged from 3μm to 6μm.

12. The liquid crystal display device as claimed in claim 9, wherein said first electrode is a bias electrode.

13. The liquid crystal display device as claimed in claim 12, wherein said second electrode is a data electrode.

14. The liquid crystal display device as claimed in claim 13 further comprising a gate electrode, wherein said bias electrode and said data electrode are over an extension portion of said gate electrode.

15. The liquid crystal display device as claimed in claim 12, wherein said second electrode is a gate electrode.

16. The liquid crystal display device as claimed in claim 9, wherein said first electrode and the second electrode are any two selected from the group consisting of a gate line, a bias electrode and a data line.

17. The driving method as claimed in claim 1, wherein said first electric field is a lateral electric field.

18. The liquid crystal display device as claimed in claim 9, wherein said first electrode and said second electrode have a lateral electric field therebetween.

* * * * *